United States Patent
Jain et al.

(10) Patent No.: US 7,503,484 B2
(45) Date of Patent: Mar. 17, 2009

(54) METHODS, SYSTEMS, AND ARTICLES OF MANUFACTURE FOR A FINANCIAL CARD HAVING WARNING FEATURES

(75) Inventors: Chitra Jain, Glen Allen, VA (US); Manaw Modi, Owings Mills, MD (US)

(73) Assignee: Capital One Financial Corporation, McLean, VA (US)

(*) Notice: Subject to any disclaimer, the term of this patent is extended or adjusted under 35 U.S.C. 154(b) by 515 days.

(21) Appl. No.: 11/223,115

(22) Filed: Sep. 12, 2005

(65) Prior Publication Data

US 2006/0071065 A1    Apr. 6, 2006

Related U.S. Application Data

(60) Provisional application No. 60/608,512, filed on Sep. 10, 2004.

(51) Int. Cl.
G06K 5/00 (2006.01)
G06K 19/06 (2006.01)

(52) U.S. Cl. .................. 235/380; 235/492
(58) Field of Classification Search ............. 235/380, 235/487, 492; 340/539.21, 568.7, 572.01
See application file for complete search history.

(56) References Cited

U.S. PATENT DOCUMENTS

| | | | |
|---|---|---|---|
| 3,959,789 A | 5/1976 | McGahee | |
| 4,260,982 A | 4/1981 | DeBenedictis et al. | |
| 4,652,865 A | 3/1987 | Maharshak | |
| 4,719,453 A | 1/1988 | Beck et al. | |
| 4,871,997 A | 10/1989 | Adriaenssens et al. | |
| 5,053,749 A | 10/1991 | Weiss | |
| 5,396,218 A * | 3/1995 | Olah | 340/568.7 |
| 5,418,520 A | 5/1995 | Hirshberg | |
| 5,583,488 A | 12/1996 | Sala et al. | |
| 5,642,095 A | 6/1997 | Cook | |
| 6,184,788 B1 | 2/2001 | Middlemiss et al. | |
| 6,784,787 B1 | 8/2004 | Atkins et al. | |
| 2003/0034891 A1* | 2/2003 | Pedersen | 340/568.7 |
| 2004/0155774 A1* | 8/2004 | Chen | 340/539.21 |

FOREIGN PATENT DOCUMENTS

GB    2236000 A *    3/1991

OTHER PUBLICATIONS

"Beeping Wallets—Stylish leather wallets to protect credit cards and more," http://www.beepingwallet.com/about.cfm, (visited Jun. 7, 2004), 1 page.
"Beeping Wallets—Stylish leather wallets to protect credit cards and more," http://www.beepingwallet.com, (visited Jun. 7, 2004), 1 page.

* cited by examiner

Primary Examiner—Daniel A Hess
(74) Attorney, Agent, or Firm—Finnegan, Henderson, Farabow, Garrett & Dunner LLP

(57) ABSTRACT

Methods, systems, and articles of manufacture for managing possession of a financial card product are disclosed. The system consists of a transmitting device, where the transmitting device is capable of being attached to a financial card product and transmitting a pulsed electromagnetic signal. The system also consists of a separate receiving device, where the receiving device comprises a sensor for detecting the electromagnetic signal, logic for processing the electromagnetic signal, and an alarm circuit such that the receiving device actuates the alarm circuit when the sensor senses that the receiving device is moved away from the transmitting device for longer than a predetermined time.

16 Claims, 4 Drawing Sheets

US 7,503,484 B2

METHODS, SYSTEMS, AND ARTICLES OF MANUFACTURE FOR A FINANCIAL CARD HAVING WARNING FEATURES

RELATED APPLICATION

This application claims the benefit of priority from U.S. Provisional Application No. 60/608,512, entitled "Methods, Systems and Articles of Manufacture for a Financial Card Having Warning Features" filed Sep. 10, 2004, the disclosure of which is expressly incorporated herein by reference in its entirety.

FIELD OF THE INVENTION

This invention relates to financial card products and, more particularly, to systems, methods, and articles of manufacture for financial card products that help individuals keep their financial cards from being lost or stolen.

BACKGROUND

Financial card products have become so universally well known and ubiquitous that they have fundamentally changed the manner in which financial transactions and dealings are viewed and conducted in society today. Financial card products are most commonly represented by plastic card-like members that are offered and provided to customers through financial card issuers (such as banks and other financial institutions). For example, with a financial card, an authorized customer or cardholder is capable of purchasing services and/or merchandise without an immediate, direct exchange of cash. Typically, a customer who has any financial cards keeps these cards in a wallet. However, there are many instances when a customer would not carry a wallet and would keep the financial card in a money clip or even in his pocket.

Even though financial cards are issued to a single person, or in some cases, families or corporations, anyone who is in possession of a financial card could potentially use it to make a transaction. This is often a problem because credit cards are often stolen or left behind after a transaction.

Previous systems to help customers keep track of their financial cards consisted of a special wallet built with a sensor between the flaps where the financial card sits. When a customer removes a financial card, the separators (the flaps between the cards) in the wallet will come in contact, which completes a circuit to trigger a warning beep. The wallet will continue to beep until the financial card is placed back into the same exact slot from which it was removed. Such systems, however, not only require that a customer buy a specialized wallet in order to solve the problem of losing their financial cards, but also present the problem of being a nuisance to the customer because the wallet may beep continuously as long as the financial card is removed from the wallet. Also, such systems require that a customer keep the financial card in the wallet, and if the wallet breaks or if the customer does not wish to carry the wallet, then the financial cards are no longer protected from being lost.

SUMMARY

Accordingly, there is a need for an improved method, system, and article of manufacture for allowing customers to keep track of their financial card products without depend upon a specialized wallet.

Methods, systems, and articles of manufacture consistent with the principles of the present invention enable a financial card user to manage possession of a financial card product. Moreover, systems and methods consistent with the present invention may receive at a receiving device an electromagnetic signal transmitted from a transmitting device affixed onto the financial card product and sound an alarm on the receiving device when the transmitting device is located farther than a predetermined distance from the receiving device.

Another embodiment consistent with the systems and methods of the present invention may consist of a transmitting device, where the transmitting device is capable of being attached to a financial card product and transmitting a pulsed electromagnetic signal. Moreover, systems and methods consistent with the present invention may further consist of a separate receiving device, where the receiving device comprises of sensor for detecting the electromagnetic signal, logic for processing the electromagnetic signal, and an alarm circuit such that the receiving device actuates the alarm circuit when the sensor senses that the receiving device is moved away from the transmitting device for longer than a predetermined time.

It is to be understood that both the foregoing general description and the following detailed description are exemplary and explanatory only, and are not restrictive of the invention, as described. Further features and/or variations may be provided in addition to those set forth herein. For example, the present invention may be directed to various combinations and subcombinations of the disclosed features, and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Figure 1:
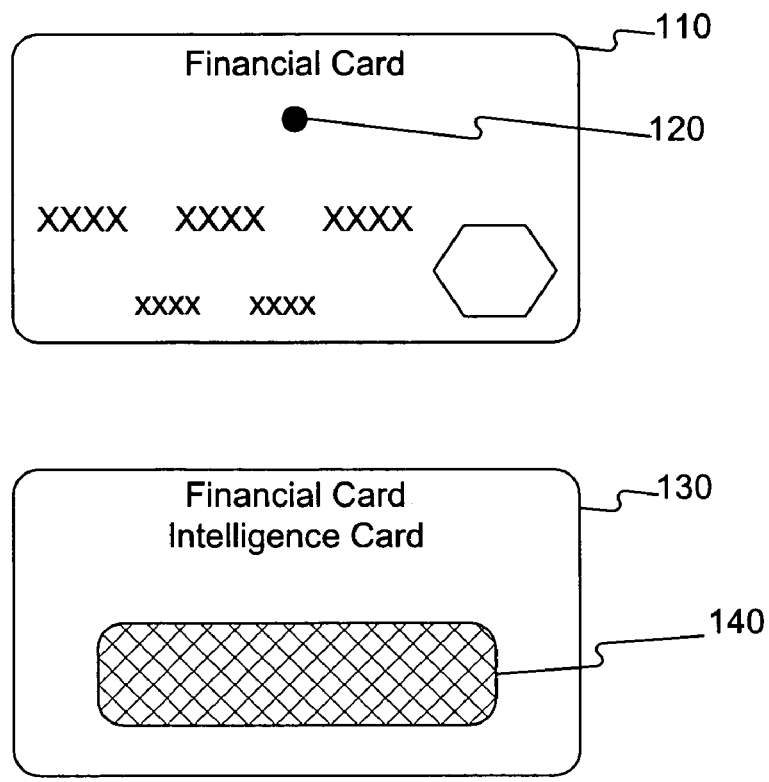
FIG. 1 illustrates an exemplary financial card product and financial card intelligence card, consistent with the present invention.

The following detailed description refers to the accompanying drawings. Whenever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

The present invention is directed to methods, systems, and articles of manufacture for providing financial card customers with a system that allows them to keep track of their financial cards and to alarm the customers once the financial cards are moved a certain distance away from another card associated with the financial cards of the customer.

The above-noted features and other aspects and principles of the present invention may be implemented in various environments. Such environments and related applications may be specially constructed for performing the various processes and operations of the invention, or they may include a general purpose computer or computing platform selectively activated or reconfigured by program code to provide the necessary functionality. The processes disclosed herein are not inherently related to any particular computer or other apparatus, and aspects of these processes may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

Reference will now be made in detail to the invention, examples of which are illustrated in the accompanying drawings. Wherever possible, the same reference numbers will be used throughout the drawings to refer to the same or like parts.

FIG. 1 illustrates an exemplary financial card product 110 and financial card intelligence card 130 in accordance with methods and systems consistent with the present invention. Financial card product 110 may have attached to it a radio frequency identification (RFID) tag 120. In one embodiment, the RFID tag 120 may be laminated to the back face of the financial card product 110 (not pictured). In another embodiment, the RFID tag 120 may be embedded into the financial card product 110. As an example, the RFID tag 120 may be bonded to the back face of the financial card product 110 by embedding it within a thin bond line of epoxy-based material.

Financial card intelligence card 130 may have attached to it a radio frequency interrogator unit (hereinafter "interrogator") 140. Alternatively, a skilled artisan may recognize that interrogator 140 does not have to be on a card 130, and thus, card 130 does not need to be used. For example, in one embodiment, interrogator 140 may be embedded into a magnetic sticker that can be placed anywhere a customer wishes, such as, inside a purse or briefcase (not pictured). Interrogator 140 can thus be included in or on any appropriate type of housing. Interrogator 140 may though be of a small size lending itself to applications employing small housings, such as cards, miniature tags, etc. However, larger housings can also be employed. In any event, interrogator 140 may be housed in any appropriate housing or supported from or attached to an object in any desired manner, for example by using double-sided tape, glue, lanyards, a leash, nails, staples, rivets, or any other fastener.

In one exemplary embodiment, interrogator 140 may be housed in any Injection-molded plastic could, such as ABS or acrylonitrile butadiene styrene. Various components of interrogator 149, such as a magnetic reed switch or a Hall effect sensor to detect the relative proximity of card 110, a battery, a timer, or a sound chip, could be assembled into an injection-molded housing. Interrogator 140 may also include memory to store threshold level information (described below) as well as radio frequency information received from RFID tag 120. Such components of interrogator 140 are well known to those of ordinary skill in the art, and, as will be appreciated by one skilled in the art, may be assembled into an injected-molded housing.

Figure 2A:
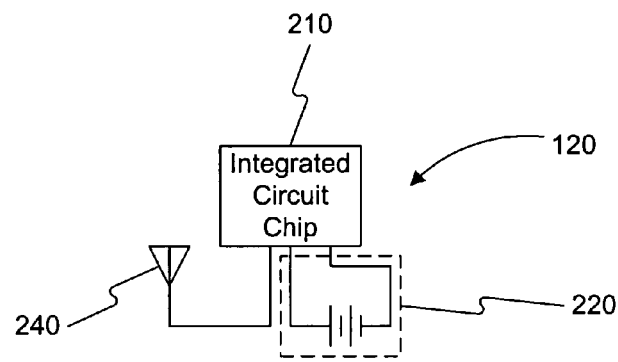
FIG. 2A illustrates an exemplary RFID tag shown in FIG. 1, consistent with the present invention.

FIG. 2A illustrates an exemplary RFID tag 120. As shown, the RFID tag 120 may include an integrated circuit 210, a power source 220 connected to the integrated circuit 210 to supply power to the integrated circuit 210, and at least one antenna 230 connected to the integrated circuit 210 for radio frequency transmission and reception of data to and from circuit 210. The integrated circuit 210 may thus include a receiver and a transmitter (not pictured). For purposes of this disclosure, including the appended claims, the term "integrated circuit" may be defined as a combination of interconnected circuit elements inseparably associated on or within a continuous substrate. The integrated circuit 210 will be described in greater detail below. The power source 220 may be a battery or other suitable power source, and various configurations are possible for the antenna 240.

Integrated circuit 210 may include a sensor mechanism, a signal level detector, and a timing device (not pictured). The signal level detector detects the strength of the signal between interrogator 140 and RFID tag 120. The customer or the financial card issuer may set two different signal threshold levels that may exist between the RFID tag 120 and interrogator 140. The first signal threshold may be the level at which the signal can exist, the second signal threshold may be the level that the alarm would sound if the signal was below it. If the signal level between the RFID tag 120 and interrogator 140 drops below the second signal threshold, then the alarm on interrogator 140 may sound. The alarm will keep sounding until interrogator 140 and RFID tag 120 are brought close enough together again so that the second signal threshold level is met. Once the second signal threshold level is met again, the alarm will stop sounding. For example, if a customer takes the financial card product 110 out of his wallet and leaves it at a store, the signal level between interrogator 140 and the RFID tag 120 on the card product will continue to decrease. Once it is below the second signal threshold level that the customer may have initially set, then the alarm on interrogator 140 may sound.

In another embodiment, the sensor mechanism may also detect that the signal from the RFID tag 120 and interrogator 140 is not below the second threshold level but is lower than the first threshold level. If the sensor mechanism senses that the sensor is below the first signal threshold level longer than a predetermined time period, as determined by the timing mechanism of interrogator 140, then the alarm on interrogator 140 may also sound. The alarm may sound until interrogator 140 and the RFID tag 120 are brought close enough together so that the predetermined time threshold is met.

In one embodiment, separate antennas are provided for the receiver and the transmitter of the integrated circuit 210 (not pictured). In another embodiment (FIG. 2B), a single antenna may be shared by the receiver and transmitter sections. In exemplary embodiments, the antenna may be formed by conductive epoxy screened onto a card or housing. In one exemplary embodiment, the antenna may be conductively bonded to the integrated circuit via bonding pads. Further, in an embodiment where a single antenna is employed, the antenna may comprise a folded dipole antenna defining a continuous conductive path, or loop, of microstrip. Alternatively, the antenna may be constructed as a continuous loop antenna.

Figure 2B:
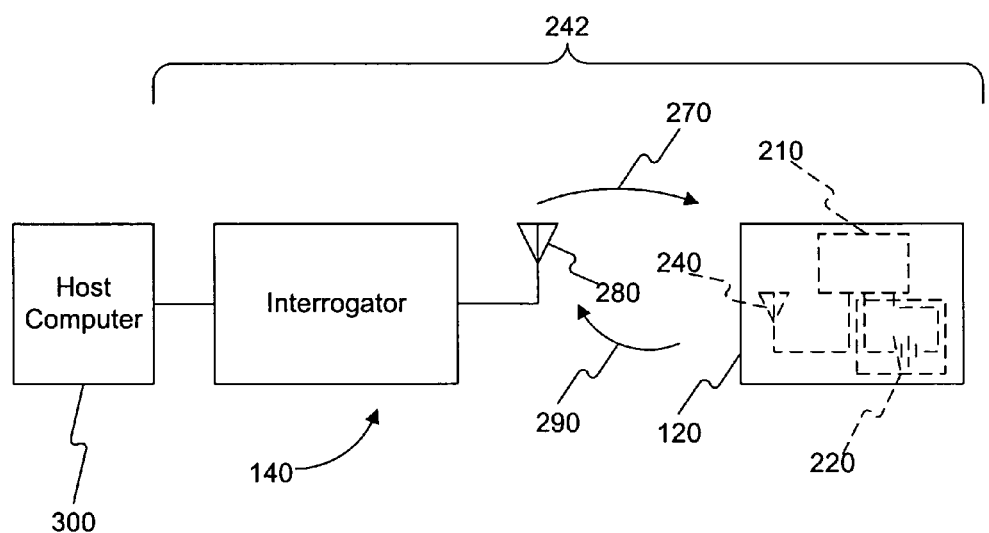
FIG. 2B illustrates an exemplary radio frequency communication system including an RFID tag and an interrogator, consistent with the present invention.

FIG. 2B illustrates a radio frequency communication system 242 including the RFID tag 120 and interrogator 140. The RFID tag 120 may transmit and receive radio frequency communications to and from interrogator 140. Preferably, interrogator 140 includes an antenna 280, and may include dedicated transmitting and receiving circuitry similar to that implemented on the integrated circuit 210. Interrogator 140 may also include an alarm system (not pictured). The alarm system may alert the customer with a beep if the customer turns on the alert on-off switch. The customer would have the choice of a tone.

Radio frequency communication system 242 may further include a host computer 300 communicating with interrogator 140. Host computer 300 may act as a master with respect to interrogator 140 in a known type of master-slave relationship with interrogator 140. Host computer 300 may include an applications program for controlling interrogator 140 and interpreting responses, received from RFID 120 and a library of radio frequency identification device applications or functions, for example, communicate with interrogator 140. These functions effect radio frequency communication between interrogator 140 and the RFID tag 120. The host computer 300 is described in further detail below with respect to FIG. 3.

Generally, interrogator 140 may include an antenna 280, that transmits an interrogation signal or command 270 ("forward link") via the antenna 280. The RFID tag 120 may receive the incoming interrogation signal via its antenna 240. Upon receiving the signal 270, the RFID tag 120 may respond by generating and transmitting a responsive signal or reply 290 ("return link"). The responsive signal 290 may be encoded with information that uniquely identifies or labels the particular RFID tag 120 that is transmitting, so as to identify any object or person with which the RFID tag 120 is associated.

In the illustrated embodiment in FIG. 2B, there may be no communication between multiple RFID tags 120. Instead, each RFID tag 120 may communicate with a respective interrogator.140. The radio frequency communication system 242 would operate in a similar manner if the RFID tag 120 may be provided in a housing, such as the housing of FIG. 1, or any other appropriate housing or support. Multiple RFID tags 120 can be used in the same field of an interrogator 140 (i.e., within the communications range of an interrogator 140). Similarly, multiple interrogators 140 can be in proximity to one or more of the RFID tags 120.

Figure 3:
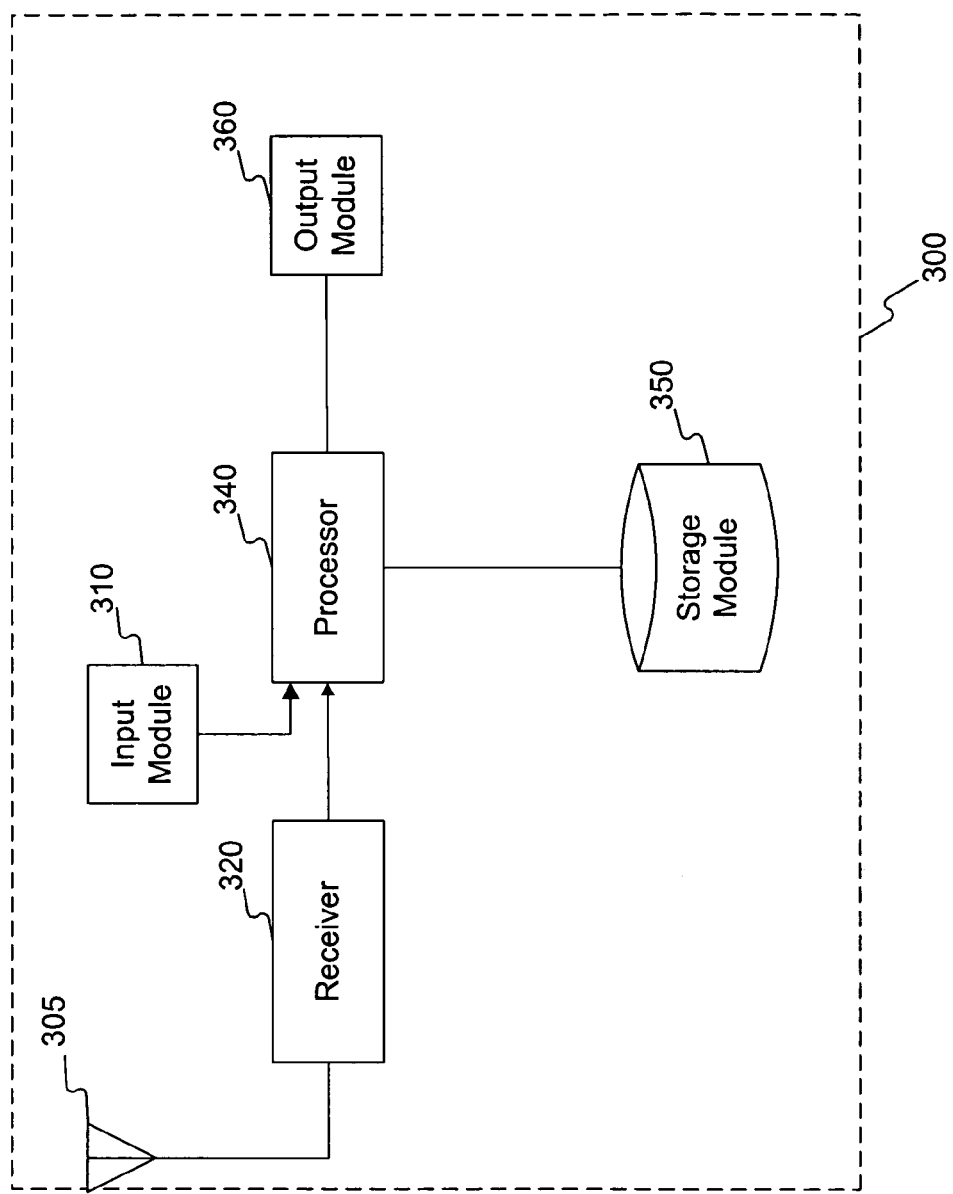
FIG. 3 illustrates an exemplary system for the host computer of FIG. 2B, consistent with the present invention.

FIG. 3 shows an exemplary host computer 300 for a radio frequency transmitter. Referring to FIG. 3, the system 300 may include an antenna 305, a receiver 320, a processor 340, a storage module 350, an input module 310, and an output module 360. The receiver 320 may be a standard receiver capable of providing radio frequency information received from the RFID tag 120.

Although FIG. 3 illustrates only a single processor 340, the system 300 may alternatively include a set of processors 340. The processor 340 may also include, for example, one or more of the following: one or more central processing units (CPUs), a coprocessor, memory, registers, and other data processing devices and systems as appropriate. Moreover, the processor 340 may control the receiver 320; collect and then store information provided by the receiver 320; preprocess and/or process the collected information; estimate a statistic, such as standard deviation, based on the collected information; and determine the signal coverage of a radio frequency transmitter.

The input module 310 may be implemented with a variety of devices to receive a user's input and/or provide the input to the processor 340. Some of these devices (not shown) may include, for example, a network interface card, a modem, a keyboard, a mouse, and an input storage device.

The storage module 350 may be embodied with a variety of components or subsystems, including, for example, a hard drive, an optical drive, a general-purpose storage device, and/or a removable storage device. Further, although storage module 350 is illustrated in FIG. 3 as being separate or independent from processor 340, the storage module 350 and processor 340 may be implemented as part of a single platform or system. Storage module 350 may be used, for example, to store the radio frequency information received from interrogator 140 and/or threshold level information set by a user, as described above.

In one embodiment, receiver 320 may be a GPS receiver. In this embodiment, GPS may be used in place of RFID. Financial card product 110 as well as intelligence card product 130 may each include a GPS transmitter. Receiver 320 may be able to provide position information based on information received from the GPS transmitter on each card, including one or more of the following: a latitude, a longitude, a time, a heading, and/or a velocity. Each transmitter may transmit a GPS signal with coordinates of the location of each transmitter, and processor 340 may compare the coordinates of each signal to determine how far the two transmitters are from each other. Based on this information, and also on signal threshold information set by the user, the alarm on the Financial Card Intelligence card 130 may sound.

Although the present invention has been described based on the host computer 300 shown in FIG. 3, one skilled in the art would realize that various other configurations may be employed by methods, systems, and articles of manufacture consistent with certain principles related to the present invention without affecting its scope.

Figure 4:
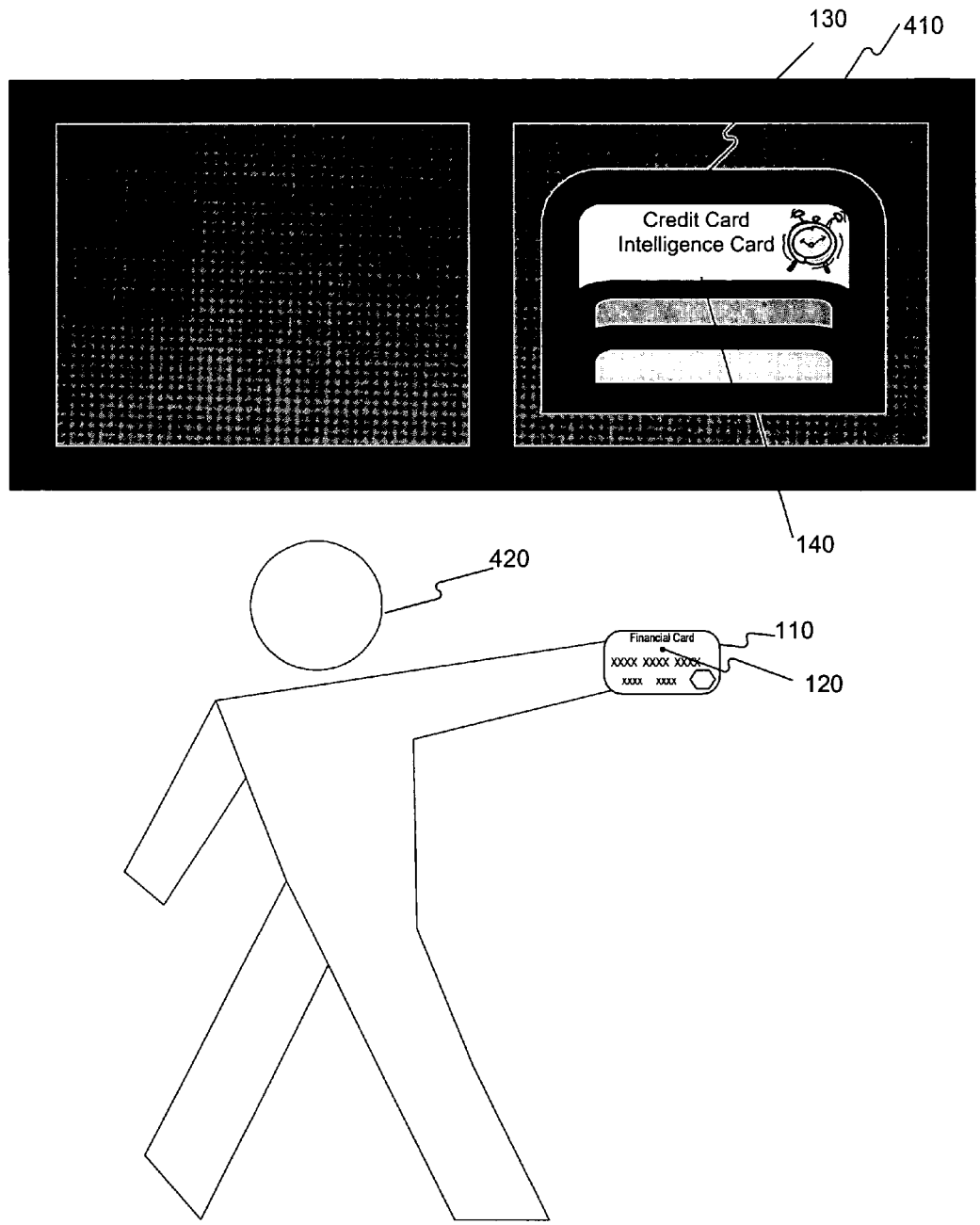
FIG. 4 illustrates an exemplary financial card product being used, consistent with the present invention.

FIG. 4 illustrates a financial card product 110 being used in accordance with methods and systems consistent with the present invention. As illustrated, a customer 420 may use financial card product 110 with a RFID tag 120 to make a transaction by first taking it out of his or her wallet 410. If the financial card product 110 is out of the wallet 410 for a period of time longer than a preset period of time, the alarm unit on interrogator 140 may sound. In another embodiment, the alarm on interrogator 140 may sound if the financial card product 110 with a RFID tag 120 is separated from interrogator 140 by a distance greater than preset in the RFID tag 120 or interrogator 140.

The time limit for separation or the spatial limit for separation between the financial card product 110 with a RFID tag 120 and interrogator 140 may, for example, be determined by a financial card issuer or by the customer. In the illustrated embodiment, interrogator 140 may be attached to an intelligence card product 130 as shown in FIG. 1.

A customer may choose to manually turn the alarm of interrogator 140 on or off. If the alarm is in the off position, interrogator 140 may not set off the alarm if the financial card product 110 with a RFID tag 120 is located away from interrogator 140 for more than a predetermined distance or longer than a predetermined time. The customer may at any time choose to turn the alarm of interrogator 140 back on to allow interrogator 140 to again alarm if the financial card product 110 with the RFID tag 120 is located away from interrogator 140 in a way that exceeds a preset threshold.

In another embodiment, a customer 420 may have more than one financial card product 110 and be able to keep track of all the cards with one interrogator 140. The first time the customer orders a financial card product 110 from a financial card issuer, the financial card issuer also includes an interrogator 140 in whatever form the customer wishes, whether it is as a financial card intelligence card 130 or in any other form described above. If the customer 420 orders another financial card product 110 from the financial card issuer, the financial card issuer, instead of sending the financial card product 110 with another interrogator 140, can program the existing interrogator 140 with the identification of the new financial card product RFID tag 120 so that the customer can use the existing interrogator 140 to keep track of both cards.

Accordingly, as described above, systems and methods consistent with the invention provide financial card customers with a system that allows them to keep track of their financial cards and to alarm the customers once the financial cards are removed from their known possession. Other embodiments of the invention will be apparent to those skilled in the art from consideration of the specification and practice of the invention disclosed herein. It is intended that the specification and examples be considered as exemplary only, with a true scope and spirit of the invention being indicated by the following claims. For example, the diagrams of FIGS. 1-4 are not limited to those described above. Variations of these designs, such as the removal and/or the addition of other devices, may be implemented without departing from the spirit and scope of the present invention.

Additionally, the present invention may be applied to other cards other than financial card products. Any financial institution that provides financial card products to customers may employ methods, systems, and articles of manufacture consistent with certain principles related to the present invention. For example, the present invention may be used in conjunction with a bank card or an ATM card.

Furthermore, although aspects of the present invention are described as being associated with data stored in memory and other storage mediums, one skilled in the art will appreciate that these aspects can also be stored on or read from other types of computer-readable media, such as secondary storage devices like hard disks, floppy disks, or CD-ROMs; carrier waves from the Internet; or other forms of RAM or ROM. Accordingly, the invention is not limited to the embodiments described above, but instead is defined by the appended claims in light of their full scope of equivalents.

What is claimed is:

1. A method for warning a user of a financial card product, comprising:
    receiving at a receiving device an electromagnetic signal transmitted from a transmitting device attached to the financial card product, wherein the transmitting device is a sticker with a RFID circuit; and
    triggering an alarm on the receiving device when the transmitting device is located farther than a substantially predetermined distance from the receiving device.

2. The method of claim 1, wherein the receiving device is an interrogator.

3. The method of claim 2, wherein the interrogator is separate from the financial card product.

4. The method of claim 1, further comprising:
    receiving at a computer the electromagnetic signal transmitted from the transmitting device; and
    using the electromagnetic signal to determine a location of the financial card product.

5. The method of claim 4, wherein the computer includes a receiver for receiving the electromagnetic signal.

6. The method of claim 5, wherein the receiver is a global positioning system receiver.

7. A method for warning a user of a financial card product, comprising:
    receiving at a receiving device an electromagnetic signal transmitted from a transmitting device attached to the financial card product, wherein the transmitting device is a sticker with a RFID circuit; and
    triggering an alarm on the receiving device when the transmitting device is located beyond a predetermined distance away from the receiving device for longer than a predetermined time limit.

8. The method of claim 7, wherein the receiving device is an interrogator.

9. A system for warning a user of a financial card product, comprising:
    a transmitting device, the transmitting device being a sticker with a RFID circuit capable of being attached to a financial card product and transmitting a pulsed electromagnetic signal; and
    a separate receiving device, the receiving device comprising:
    a sensor for detecting the electromagnetic signal; and
    an alarm circuit such that the receiving device actuates the alarm circuit when the sensor senses that the receiving device is moved away from the transmitting device for longer than a predetermined time.

10. The system of claim 9, wherein the receiving device is an interrogator.

11. A radio frequency proximity sensor apparatus for a financial card product, comprising:
    a transmitting device, the transmitting device being a sticker with a RFID circuit capable of being attached to a financial card product and transmitting a pulsed electromagnetic signal; and
    a separate receiving device, the receiving device comprising:
    a detection system for detecting the electromagnetic signal; and
    an alarm circuit such that the receiving device actuates the alarm circuit when the detection system detects that the receiving device is moved away from the transmitting device for longer than a predetermined time.

12. The system of claim 11, wherein the receiving device is an interrogator.

13. A financial card product comprising:
    a transmitting device that transmits a signal to a remote receiving device to trigger an alarm circuit when the receiving device detects that the transmitting device is located at least a determined distance from the receiving device for longer than a predetermined time,
    wherein the transmitting device is a sticker with a RFID circuit attached to a financial account product.

14. A receiving device comprising:
    a sensor that detects a signal from a transmitting device that transmits the signal; and
    an alarm circuit that activates an alarm when the transmitting device is located at least a determined distance from the receiving device for longer than a predetermined time,
    wherein the transmitting device is a sticker with a RFID circuit attached to a financial account product.

15. A method for warning a user of a financial card product, comprising:
    receiving at a receiving device an electromagnetic signal transmitted from a transmitting device attached to the financial card product; and
    triggering an alarm on the receiving device when the transmitting device is located at least a determined distance from the receiving device;
    wherein the transmitting device is a sticker with a RFID circuit attached to the financial card product.

16. A system for warning a user of a financial card product, comprising:
    a transmitting device capable of being attached to a financial card product and transmitting an electromagnetic signal,
    wherein the transmitting device is a sticker with a RFID circuit attached to the financial card product; and
    a separate receiving device, the receiving device comprising:
    a sensor for detecting the electromagnetic signal, and
    an alarm circuit such that the receiving device actuates the alarm circuit when the sensor senses that the receiving device is moved away from the transmitting device for longer than a predetermined time.

* * * * *